United States Patent Office  3,268,526
Patented August 23, 1966

3,268,526
HETEROCYCLIC POLYHALOBENZAMIDE
DERIVATIVES
Peter E. Newallis, Morris Plains, N.J., and John P. Chupp and Joseph W. Baker, Kirkwood, Mo., assignors to Monsanto Company, a corporation of Delaware
No Drawing. Filed Sept. 12, 1962, Ser. No. 223,243
10 Claims. (Cl. 260—247.7)

The present invention relates to polyhalobenzamides having heterocyclic amide groups. More particularly, the present invention relates to new polyhalobenzamides, which comprise outstanding herbicides, especially grass specific herbicides and to methods of inhibiting the germination and growth of undesired plants employing such compounds.

This application is a continuation-in-part of application Serial Number 834,424, filed August 18, 1959, now abandoned.

The new class of compounds are those having the following structure:

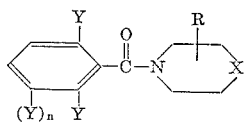

wherein $n$ is an integer of from 0 to 1; X is selected from the group consisting of —$CH_2$—, —N—, —O— and —S—; Y is a halogen atom, such as chlorine, bromine, fluorine and iodine; and R is a radical selected from the group consisting of hydrogen, halogen, lower alkyl radicals, i.e. alkyl radicals having from one to four carbon atoms and hydroxy substituted lower alkyl radicals. A preferred group of these heterocyclic nitrogen analogs are those in which the Y radical in the above structure is a chlorine atom.

The amide portion of the compounds coming within the scope of the above formula is derived from cyclic, six-membered secondary amines, as for example 2-pipecoline, 3-pipecoline, 4-pipecoline, 2,6-dimethylpiperidine, 2,4-dimethylpiperidine, 2,3,6-trimethylpiperidine, 2-methyl-5-ethylpiperidine, piperazine, 2,6-dimethylpiperazine, 4-hydroxypropylpiperazine, 4,5-dimethylpiperazine, morpholine, 2-methylmorpholine, thiamorpholine, 2-ethylmorpholine, etc.

The term "polyhalobenzamide" as used herein throughout the specification shall be understood to refer to the polyhalobenzoyl heterocyclic amine compounds described herein.

These new chemical compounds may be prepared by the reaction of the appropriate halobenzoyl chloride with the appropriate heterocyclic secondary amine. This reaction can be carried out in an organic solvent in the presence of a hydrogen chloride acceptor, e.g. a tertiary amine or an excess of the amine reactant. Similarly the reaction can be carried out in an aqueous media, as for example in a dilute aqueous solution of sodium carbonate (HCl acceptor). Because of the exothermic nature of the reaction, it is preferred to slowly add the acid chloride to the solution of the amine and hydrogen chloride acceptor. After the addition of the acid chloride is complete, and the reaction mixture has been agitated at approximately 50° C. for a short period, e.g. 30 minutes to 1 hour, the polyhalobenzamide can be recovered from the reaction mixture by any means known to those skilled in the art. For example, the product can be extracted from an aqueous reaction mixture by the use of a suitable organic solvent, e.g. methylene chloride; the product is then recovered by stripping off the organic solvent at subatmospheric pressures.

The active compound is, of course, applied in an amount sufficient to exert the desired herbicidal action. The amount of active compound present in the compositions as actually applied for preventing weeds, i.e. unwanted plants, will vary with the manner of application, the particular weeds for which the control is sought, the purpose for which the application is being made, and like variables. In general, the herbicidal compositions as applied will contain from about 1% to about 90% by weight of the polyhalobenzamides.

Valuable herbicidal effects will be observed by applications of small amounts, for example as low as one-half pound of active compound per acre, as well as high concentrations, for example 100 pounds per acre. As a general rule, the selective activity on grasses is exhibited at lower rates of application, for example 2 to 10 pounds per acre. For general application and herbicidal effect on both grasses and dicotyledonous plants, it usually will be found necessary to use amounts in the range of 10 to 50 pounds per acre. Herbicidal compositions of the invention are prepared by admixing one or more of the polyhalobenzamides defined heretofore in herbicidally effective amounts, with a herbicidal conditioning agent of the kind used and referred to in the art as a pest control adjuvant or modifier to provide formulations adapted for ready and efficient application to the soil using conventional applicator equipment.

The solid formulations, frequently referred to as "dusts" may contain in addition to the active ingredients, diluents or extenders, dispersing agents to prevent local high concentration and agents to facilitate distribution in soil or soil waters. Suitable soil diluents are those which render the compositions permanently dry and free-flowing. Thus hygroscopic materials are to be avoided unless the compositions also contain a separate substance to serve as an aid to flowability. Effective solid diluents preferably pulverulent or granular in form so as to be effective carriers for the active ingredient, are the natural clays such as china clays, the bentonites and the attapulgites; other minerals in a natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight of the entire formulation as applied to the soil. More concentrated herbicides will require dilution by the user in order to properly condition the soil for the most effective usage. The concentrated solid herbicidal formulations can be used with less danger if they are mixed with the surface soil by means of a disk plow or harrow at the time of application.

The liquid compositions for herbicidal use may be solutions, or other liquid dispersions. The choice of a liquid medium will depend to some extent upon the physical properties of the active ingredient. The polyhalobenzamides are, for the most part, insoluble in water and therefore aqueous formulations will necessarily be dispersions of minute drops or particles of the water-insoluble substances in suspension in an aqueous medium. The known water-insoluble polyhalobenzamides of this invention may first be dissolved in a suitable organic solvent and the organic solution of the active ingredient then incorporated in water or in any aqueous medium to produce a heterogeneous dispersion of the active ingredient in water.

Many of the formulations are benefited by the incorporation of organic solvents for the active components, such as the organic alcohols, ketones and hydrocarbons, for example isopropanol, benzene, acetone, methylethyl ketone, kerosene and chlorinated hydrocarbons. The proportions of such organic liquid additives will depend upon the solubility properties of the active ingredient and may require as little as 1 percent or as much as 80 percent or more in order to provide a uniformly distributed formulation which is capable of maintaining its distributed state during storage, use and application to the soil.

The surface-active dispersing agents employed can be of the anionic, cationic, or nonionic type and include, for example, sodium and potassium oleate, the amine salts of oleic acid such as morpholine and dimethylamine oleates, the sulfonates animal and vegetable oils such as sulfonated fish and castor oils, sulfonated petroleum oils, sulfonated acrylic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol, monostearate, glycerol monostearate, diglycol monostearate, diglycol oleate, polyethylene oxides, ethylene oxides condensation products with stearyl alcohol and octyl phenol, polyvinyl alcohols, salts, such as the acetate of polyamines from the reductive amination of ethylene/carbon monoxide polymers, laurylamine hydrochloride, laurylpyridinium bromine, stearyltrimethylammonium bromide, cetyldimethylbenzyl ammonium chloride, lauryl dimethylamine oxide and other simple and polymeric compositions having both hydroprillic and hydrophobic functions so as to enable the mixing of otherwise immiscible ingredients. Generally, the surface-active agents will represent only a minor portion of the formulation as used, for example, less than 15 percent and frequently as low as 0.05 percent by weight of the composition. Usually, concentrations of from 0.5 to 5 percent are found to be optimum.

A useful formulation of the herbicidal compositions may involve the solid or liquid concentrate of the active ingredient to which has been added formulation aids, one or more of the aforementioned herbicidal conditioning agents, so that the concentrates may be mixed with a suitable extender or diluent in the field at the time of use. Obviously for this purpose the dispersing or surface active agents will be present in larger concentrations so that upon dilution with water or a solid extender, compositions containing optimum proportions of dispersing agents and active ingredient will be prepared.

The herbicidal compositions are applied either as a spray or a dust to the locus or area to be protected from undesirable plant growth. Such application can be made directly upon the soil in advance of an anticipated weed infestation, as for example, in the form of a spray applied directly to the surface of the soil, or in the form of a dry powdered composition which can be dispersed in the surface soil. The phrase "applying to the soil," as used hereinafter in the specification and claims, shall be understood to refer to any method of applying the active ingredient to the soil for pre-emergence control. Regardless of the method of application employed, a readily flowable composition is required. Thus a critical aspect of this invention is the fluent carrier without which the optimum herbicidal effects cannot be achieved.

Both the solid and the liquid formulations above described are useful in the application of herbicides, because they facilitate the uniform distribution and aid in the inhibition of undesirable plants by maintaining the active ingredient in a form which enables its prompt assimilation by the plant and the efficient utilization of its phytotoxic properties. The described conditioning agents enable the proper use to achieve the desired herbicidal effects by an unskilled operator without elaborate equipment.

Fertilizer materials, other herbicidal and other pest control agents, such as fungicides and insecticides, can be included in the herbicidal compositions of the invention if desired.

The following examples are given to illustrate in detail the preparation and properties of some of the new compounds of this invention, but such are not to be considered a limitation thereof. Unless otherwise stated, parts given are parts by weight.

EXAMPLE 1

To a suitable reaction vessel containing 7.6 grams of 2-methyl-5-ethylpiperidine and 4.3 grams of sodium carbonate in 100 cc. of water, there is added dropwise, with stirring, 14.6 grams of 2,3,6-trichlorobenzoyl chloride. During the addition care is taken so that the temperature does not exceed 60° C. After the acid chloride addition is complete, the reaction mixture is stirred for about 1½ hours. The mixture is then cooled and allowed to separate into a lower oil layer and an upper water layer. The oil is extracted with methylene chloride and stripped at 60° C. (8 mm. Hg abs. pressure) to give 20 grams of N - (2,3,6 - trichlorobenzoyl)-5-ethyl-2-methylpiperidine. This compound is a red-amber liquid which is insoluble in water; slightly soluble in either, heptane and ethanol; and soluble in acetone and benzene.

*Analysis.*—Calculated: Cl, 31.8%; N, 4.18%. Found: Cl, 35.5%; N, 3.6%.

Utilizing the procedure of Example 1 except by substituting an equivalent amount of the following heterocyclic secondary amines for the 2-methyl-5-ethylpiperidine of said example, a good yield of the corresponding 2,3,6-trichlorobenzoyl heterocyclic amines are obtained. The amine reactants and the analytical data on the products obtained are summarized below:

| Example No. | Amine Reactant | Product Analysis | | Physical Properties |
|---|---|---|---|---|
| | | Calc. | Found | |
| 2 | N-methylpiperazine | Cl 34.9 | 35.1 | White solid, M.P., 129.5° C. |
| | | N 9.22 | 9.4 | |
| 3 | Morpholine | Cl 35.8 | 37.1 | White solid, M.P., 137.2. |
| | | N 4.7 | 4.3 | |
| 4 | 2-pipecoline | Cl 34.6 | 35.5 | Dark amber glassy solid. |
| | | N 4.5 | 4.3 | |
| 5 | 4-pipecoline | Cl 34.6 | 33.4 | Tan solid, M.P., 95.5. |
| | | N 4.5 | 4.5 | |
| 6 | Piperidine | Cl 36.2 | 33.6 | Yellow solid, M.P., 87.2. |
| 7 | 3,5-dimethyl-morpholine | Cl 32.9 | 33.2 | Viscous red oil. |
| | | N 4.3 | 4.3 | |
| 8 | 2,6-dimethyl-piperidine | Cl 33.2 | 39.6 | White solid. |
| | | N 4.4 | 3.5 | |
| 9 | N'-hydroxyethyl-piperazine | Cl 31.5 | 32.6 | Amber liquid. |
| | | N 8.3 | 8.3 | |
| 10 | 2,6-dimethyl-morpholine | Cl 32.9 | 36.4 | Tan solid. |
| | | N 4.4 | 3.7 | |

The compounds of Examples 2 through 10 are insoluble in water and soluble in varying degrees in ether, acetone, benzene, heptane, chloroform, ethanol and ethyl acetate.

EXAMPLE 11

*Pre-emergence tests*

The relative value of several polybenzamides as pre-emergence herbicides is determined by planting in greenhouse flats, seeds of thirteen different plants, each representing a principal botanical type. A solution or suspension of the test compound is prepared by first mixing 0.5 gm. with 25 cc. of acetone or some other suitable solvent. 4.1 cc. of the stock solution is diluted to a volume of 15 cc. with the solvent used and fifteen cc. of this solution is then sprayed over the entire area of a pre-planted pan (aluminum 9½″ x 5¼″, soil ⅝″ deep, seeds ⅜″ from top). This amount of chemical for the test area corresponds to a rate of approximately 25 lbs. per acre.

After spraying, the pans are placed in ½″ of water and allowed to absorb moisture through the perforated bottom until the soil surface is about one-half moist. The pans are then transferred to a wet sand bench in a greenhouse.

Fourteen days after application of the test chemical the results are observed and recorded. The number of plants of each species which germinated and grew are counted and such data are converted into herbicidal ratings, taking into account the germination and growth in untreated plants. In the following tables of herbicidal evaluation data, these plants are represented by letters as follows:

A ........................... Morning glory.
B ........................... Brome-cheat grass.
C ........................... Ryegrass.
D ........................... Buckwheat.
E ........................... Radish-mustard.
F ........................... Sugar beet.
G ........................... Cotton.
H ........................... Corn.
I ........................... Foxtail grass.
J ........................... Barnyard grass.
K ........................... Crabgrass.
L ........................... Field bindweed.
M ........................... Pigweed.

The relative value of each compound with respect to its herbicidal effect on the various plants is indicated by a number as follows:

0 ........................... No phytotoxicity.
1 ........................... Slight phytotoxicity.
2 ........................... Moderate pyhtotoxicity
3 ........................... Severe phytotoxicity.

TABLE A

| | A | B | C | D | E | F | G | H | I | J | K | L | M |
|---|---|---|---|---|---|---|---|---|---|---|---|---|---|
| N-(2,3,6-trichlorobenzoyl)5-ethyl-2-methyl piperidine | 3 | | 2 | | 3 | 2 | | | | 2 | 2 | | 3 |
| 2-(2,3,6-trichlorobenzoyl)4-picoline | 2 | | 0 | | 1 | 2 | | | | 2 | 2 | | 3 |
| 1-(2,3,6-trichlorobenzoyl)4-pipecoline | 3 | 2 | 1 | 2 | 1 | 2 | 2 | 0 | 2 | 0 | 0 | 3 | 2 |
| 1-(2,3,6-trichlorobenzoyl)2-pipecoline | 3 | 2 | 3 | 3 | 3 | 3 | 3 | 1 | 3 | 2 | 3 | 3 | 3 |
| 1-(2,3,6-trichlorobenzoyl)2,6-dimethylpiperidine | 3 | | 2 | | 3 | 3 | | | | 2 | 3 | | 3 |
| 1-(2,3,6-trichlorobenzoyl)4-hydroxyethylpiperazine | 3 | | 0 | | 2 | 2 | | | | 1 | 1 | | 3 |
| 1-(2,3,6-trichlorobenzoyl)4-methylpiperazine | 2 | 2 | 0 | 2 | 0 | 2 | 2 | 0 | 0 | 0 | 0 | 1 | 2 |
| 4-(2,3,6-trichlorobenzoyl)morpholine | 3 | | 2 | 1 | 1 | 2 | 3 | 3 | 0 | 1 | 1 | 3 | 3 |
| 1-(2,3,6-trichlorobenzoyl)piperidine | 2 | 2 | 1 | 2 | 1 | 1 | 2 | 0 | 0 | 0 | 2 | 2 | 3 |
| 1-(2,3,6-trichlorobenzoyl)2,4,6-trimethyl piperidine | 3 | | 3 | | 3 | 3 | | | | 3 | 3 | | 3 |
| 4-(2,3,6-trichlorobenzoyl)2,6-dimethylmorpholine | 3 | | 2 | | 3 | 3 | | | | 1 | 2 | | 3 |
| 4-(2,3,6-trichlorobenzoyl)3,5-dimethylmorpholine | 3 | | 2 | | 3 | 3 | | | | 3 | 3 | | 3 |

When the polyhalobenzamides of this invention are used at lower rates of application, their specificity with respect to grasses and certain broadleaf plants is more evident. The following data demonstrate their herbicidal utility:

TABLE B

| | Rate | A | B | C | D | E | F | G | H | I | J | K | L | M |
|---|---|---|---|---|---|---|---|---|---|---|---|---|---|---|
| N-(2,3,6-trichlorobenzoyl)-5-ethyl-2-methylpiperidine | 5 | 3 | 2 | 1 | | 2 | 3 | | 0 | | 2 | 2 | | 3 |
| | 1 | 3 | 1 | 0 | | 1 | 1 | | 0 | | 0 | 0 | | 2 |
| 1-(2,3,6-trichlorobenzoyl)-2,6-dimethylpiperidine | 5 | 3 | 0 | 0 | 3 | 2 | 3 | | | | 0 | 0 | | 3 |
| | 1 | 2 | 0 | 0 | 1 | 1 | 2 | | | | 0 | 0 | | 2 |
| 1-(2,3,6-trichlorobenzoyl)-2-pipecoline | 5 | 3 | 3 | 2 | 2 | 2 | 1 | 2 | 0 | 3 | 2 | 3 | 3 | 3 |
| | 1 | 3 | 0 | 0 | 2 | 2 | 2 | 3 | 0 | 1 | 2 | 1 | 2 | 3 |
| | ½ | 3 | 0 | 0 | 2 | 0 | 3 | 2 | 0 | 0 | 2 | 1 | 2 | 3 |
| | ¼ | 3 | 0 | 0 | 0 | 0 | 2 | 1 | 0 | 0 | 0 | 1 | 2 | 2 |
| | ⅛ | 2 | 0 | 0 | 0 | 0 | 1 | 0 | 0 | 0 | 0 | 1 | 2 | 1 |
| 4-(2,3,6-trichlorobenzoyl)-2,6-dimethylmorpholine | 5 | 3 | 2 | 0 | | 2 | 3 | | 1 | | 2 | 3 | | 3 |
| | 1 | 2 | 0 | 0 | | 2 | 2 | | | | 0 | 0 | | 3 |
| | ½ | 3 | 0 | 0 | | 2 | 2 | | | | 0 | 0 | | 3 |
| 1-(2,3,6-trichlorobenzoyl)-2,4,6-trimethylpiperidine | 5 | 3 | 1 | 0 | | 3 | 3 | | | | 1 | 0 | | 3 |
| | 1 | 3 | 0 | 0 | | 1 | 3 | | | | 0 | 0 | | 3 |
| 4-(2,3,6-trichlorobenzoyl)-3,5-dimethyl-3,5-dimethylmorpholine. | 5 | 3 | 1 | 0 | | 2 | 3 | | | | 0 | 0 | | 3 |
| | 1 | 3 | 0 | 0 | | 1 | 2 | | | | 0 | 0 | | 2 |
| 4-(2,3,6-trichlorobenzoyl)morpholine | 5 | 0 | 3 | 0 | 0 | 0 | 0 | 0 | 0 | 3 | 0 | 0 | 0 | 3 |
| 1-(2,3,6-trichlorobenzoyl)piperazine | 5 | 3 | 0 | 0 | | 2 | 3 | | | | 0 | 1 | | 3 |
| | 1 | 2 | 0 | 0 | | 0 | 1 | | | | 0 | 0 | | 2 |

The herbicidal efficiency of the above compounds is surprising, for related compounds possess little or no herbicidal utility. When tested as described above, at 25 lbs. per acre, a random group of such related compounds are found to possess little or no herbicidal activity.

TABLE C

|  | A | B | C | D | E | F | G | H | I | J | K | L | M |
|---|---|---|---|---|---|---|---|---|---|---|---|---|---|
| 1-(3,4-dichlorobenzoyl)-2-pipecoline | 0 | | 0 | | 0 | 0 | | | | 0 | 0 | | 0 |
| 1-(3-bromobenzoyl)-2,6-dimethylpiperidine | 0 | | 0 | | 0 | 0 | | | | 0 | 0 | | 0 |
| 2-(3,4-dichlorobenzamide)-4-methylpyridine | 0 | | 0 | | 0 | 0 | | | | 0 | 0 | | 3 |
| 1-(2,4-dichlorobenzoyl)-2,6-dimethylpiperidine | 0 | | 0 | | 0 | 0 | | | | 0 | 0 | | 0 |
| 1-(4-chlorobenzoyl)-2-pipecoline | 0 | | 0 | | 0 | 0 | | | | 0 | 0 | | 2 |

Whereas, results similar to those obtained in Tables A and B above are obtained when the following polyhalobenzamides are tested as above:

1-(2,6-dichlorobenzoyl)-2-pipecoline
1-(2,6-dichlorobenzoyl)-2,6-dimethylpiperidine
1-(2,6-dichlorobenzoyl)-2,6-dimethylmorpholine
1-(2,6-dichlorobenzoyl)-3-chloro-2-pipecoline
4-(2,6-dichlorobenzoyl)thiamorpholine
1-(2,6-dichlorobenzoyl)-5-ethyl-2-methylpiperidine
1-(2,6-dichlorobenzoyl)-4-methylpiperazine
1-(2,6-dichlorobenzoyl)piperidine
1-(2,6-dichlorobenzoyl)-4-hydroxyethylpiperazine
1-(2,6-dibromobenzoyl)-2-pipecoline
4-(2,6-dibromobenzoyl)morpholine
1-(2,6-dibromobenzoyl)piperidine
1-(2,6-diiodobenzoyl)-2-pipecoline
1-(2,6-difluorobenzoyl)-2-pipecoline
1-(2,6-dichlorobenzoyl)-2,6-dimethylpiperazine
1-(2,6-dichlorobenzoyl)-2,5-diethylpiperazine
1-(2,6-dibromobenzoyl)-2,5-dibutylpiperazine
1-(2,6-dichlorobenzoyl)methylpyridine
4-(2,6-dichlorobenzoyl)morpholine
4-(2,6-dichlorobenzoyl)-3,5-dimethylmorpholine
1-(2,3,6-trichlorobenzoyl)-2,3-dimethylpiperazine
1-(2,3,6-trichlorobenzoyl)-2,3,5,6-tetrachloropiperazine
1-(2,3,6-trichlorobenzoyl)-3-hydroxyethylpiperazine
1-(2,3,6-trichlorobenzoyl)-2,5-diethylpiperazine
1-(2,3,6-trichlorobenzoyl)-2,5-dibutylpiperazine
1-(2,3,6-trichlorobenzoyl)-1,2,6-trimethylpiperazine
4-(2,3,6-trichlorobenzoyl)thiamorpholine
4-(2,3,6-trichlorobenzoyl)-2-ethylmorpholine
4-(2-bromo-3,6-dichlorobenzoyl)thiamorpholine
1-(2-bromo-3,6-dichlorobenzoyl)-4-pipecoline
1-(2,3,6-triiodobenzoyl)-3-chloro-2-pipecoline
1-(2-fluoro-3,6-dichlorobenzoyl)-4-pipecoline
1-(2,3,6-tribromobenzoyl)-2,6-dimethylpiperidine Selective herbicidal activity with respect to several genera of grasses is illustrated by the data in the above tables. The botanical types of grasses which are effectively controlled by means of the polyhalobenzamides of this invention embrace a large number of undesirable plants or weeds, frequently found in vegetable crops. This invention is not limited to the elimination of undesirable grasses in the presence of broadleaf plants and also extends to the elimination of undesirable grasses in the presence of other narrowleaf plants. In addition, certain undesirable broadleaf plants in the same respective plant families as morning glory, sugar beet and pigweed for example, can be effectively controlled while valuable broadleaf plants in the same plant family as cotton, for example, are completely unaffected.

EXAMPLE 12

Dust formulations

The following compositions are adapted for direct application as dusts for the destruction or prevention of weeds using conventional applicator equipment. The dusts are mixed by blending or mixing the ingredients and grading the mix to give compositions having an average particle size less than about 50 microns.

(I)

| | Parts |
|---|---|
| 4-(2,3,6-trichlorobenzoyl)-2,6-dimethylmorpholine | 25 |
| Bentonite | 75 |
| | 100 |

(II)

| | |
|---|---|
| 1-(2,3,6-trichlorobenzoyl)-2-pipecoline | 8 |
| Talc | 92 |
| | 100 |

EXAMPLE 13

Water-dispersible powders

The following powdered compositions are adapted for dispersing in water for application as a spray for the destruction and prevention of weeds. The powdered compositions are made by intimately mixing the listed ingredients, using conventional mixing or blending equipment, and then grinding the mixture to give a powder having an average particle size less than about 50 microns.

(I)

| | Parts |
|---|---|
| 4-(2,3,6-trichlorobenzoyl)-2,6-dimethylmorpholine | 55 |
| Potassium disulfonate of dibutylphenyl (wetting and dispersing agent) | 4 |
| Bentonite | 41 |
| | 100 |

(II)

| | |
|---|---|
| 1-(2,3,6-trichlorobenzoyl)-2-pipecoline | 40 |
| Sodium citrate dehydrate | 5 |
| Disodium phosphate | 3 |
| Sodium dodecyl benzene sulfonate | 7 |
| Attapulgite | 45 |
| | 100 |

EXAMPLE 14

Water-dispersible liquid compositions

The following compositions are in liquid form and are adapted to give aqueous dispersions for application as sprays. In the case of some of the benzamines, the compositions will not be complete solutions, but rather will be dispersions of solid in the solvent used. The liquid or fluid compositions shown are prepared by thoroughly mixing or dispersing the active compounds and one or more conditioning agents such as dispersing or emulsifying agents, in an organic liquid diluent.

(I)

| | Parts |
|---|---|
| 4-(2,3,6-trichlorobenzoyl)-2,6-dimethylmorpholine | 25 |
| Long chain fatty alcohol sulfate (emulsifying agent) | 3 |
| Methyl cellulose (dispersing agent) | 2 |
| Methylethyl ketone | 70 |
| | 100 |

(II)

| | |
|---|---|
| 1-(2,3,6-trichlorobenzoyl)-2-pipecoline | 30 |
| Alkylated aryl polyether alcohol (wetting and dispersing agent) | 5 |
| Methyl isobutyl ketone | 65 |
| | 100 |

EXAMPLE 15

Granular compositions

The following compositions are adapted for application by means of a fertilizer spreader apparatus or similar equipment. The compositions are readily prepared by mixing the ingredients with water to form a paste. The paste is then extruded, dried and ground to give the desired granular size. Preferably, the granules will be in the order of one thirty-second to one-quarter inch in diameter.

(I)

| | Parts |
|---|---|
| 4-(2,3,6-trichlorobenzoyl)-2,6-dimethylmorpholine | 10 |
| Goulac (dispersing agent) | 5 |
| Kerosene | 3 |
| Gelatin (binding agent) | 22 |
| Talc | 60 |
| | 100 |

(II)

| | |
|---|---|
| 1-(2,3,6-trichlorobenzoyl)-2-pipecoline | 10 |
| Goulac | 5 |
| Dextrin | 20 |
| Fuller's earth | 63 |
| Hydrocarbon oil | 2 |
| | 100 |

EXAMPLE 16

Oil-water dispersible powders

The following powdered compositions are adapted for use in the preparation of spray compositions using either oil, water or a combination of oil and water as the liquid diluent. The powders are made by mixing and grinding as in the case of the powders of Example 12.

(I)

| | Parts |
|---|---|
| 4-(2,3,6-trichlorobenzoyl)-2,6-dimethylmorpholine | 60 |
| Alkylated aryl polyether alcohol (wetting and dispersing agent) | 10 |
| Fuller's earth | 30 |
| | 100 |

(II)

| | |
|---|---|
| 1-(2,3,6-trichlorobenzoyl)-2-pipecoline | 70 |
| Ethylene oxide-stearate-laurate (emulsifying agent) | 7 |
| Pyrophyllite | 23 |
| | 100 |

While this invention has been described with respect to certain embodiments, it is not so limited, and it is to be understood that variations and modifications thereof obvious to those skilled in the art may be made without departing from the spirit or scope of the invention.

What is claimed is:

1. A compound of the structure

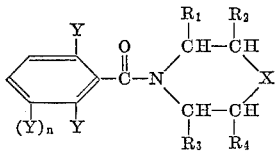

wherein $n$ is an integer of from 0 to 1; X selected is from the group consisting of —$CH_2$—, —NH—, —O— and —S—; Y is a halogen atom and $R_1$, $R_2$, $R_3$ and $R_4$ are each selected from the group consisting of hydrogen, halogen, lower alkyl and hydroxy substituted lower alkyl.

2. A compound of the structure

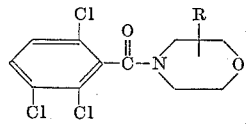

wherein R is a lower alkyl.

3. 4-(2,3,6-trichlorobenzoyl)-2,6-dimethylmorpholine.

4. A compound of the structure

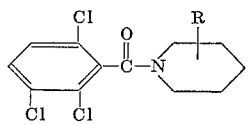

wherein R is a lower alkyl.

5. 1-(2,3,6-trichlorobenzoyl)-2-pipecoline.

6. 1-(2,3,6-trichlorobenzoyl)-5-ethyl-2-methylpiperidine.

7. 1-(2,3,6-trichlorobenzoyl)-2,6-dimethylpiperidine.

8. A compound of the structure

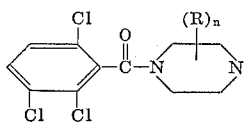

wherein $n$ is an integer of from 0 to 1 and R is a lower alkyl.

9. 1-(2,3,6-1trichlorobenzoyl)piperazine.

10. 1-(2,3,6-trichlorobenzoyl)-2,4,6-trimethylpiperidine.

References Cited by the Examiner

UNITED STATES PATENTS

| | | | |
|---|---|---|---|
| 2,282,907 | 5/1942 | Horst | 260—294.7 |
| 2,703,802 | 3/1955 | Norton | 71—2.5 XR |
| 2,717,895 | 9/1955 | Sprague et al. | 260—247.7 |
| 2,810,718 | 10/1957 | Horrom et al. | 260—268 |
| 2,835,676 | 5/1958 | Sprague et al. | 260—294.7 |
| 2,864,682 | 12/1958 | Speziale | 71—2.5 |
| 2,870,145 | 1/1959 | Perron | 260—268 X |
| 2,895,992 | 7/1959 | Ohnacker et al. | 260—247.7 |
| 2,906,728 | 9/1959 | Schweitzer | 260—294.7 |
| 2,911,294 | 11/1959 | Eden | 71—2.5 |
| 2,933,383 | 4/1960 | Lambrech | 260—268 X |
| 3,009,942 | 11/1961 | Klein et al. | 260—558 X |
| 3,030,366 | 4/1962 | Biel | 260—268 |

FOREIGN PATENTS 971,077   6/1950   France.

OTHER REFERENCES

Bottger et al.: U.S. Dept. Agr. Bulletin No. E-789, United States Dept. of Agriculture, Agricultural Research Administration, U.S. Bureau of Entomology and Plant Quarantine, pages 1–21 (1949).

Thompson et al.: Chemical Abstracts, vol. 41, pages 3902–3912 (1947).

WALTER A. MODANCE, *Primary Examiner.*

IRVING MARCUS, NICHOLAS RIZZO, *Examiners.*

J. W. MOLASKY, R. L. PRICE, A. D. SPEVACK,
*Assistant Examiners.*